United States Patent
Zhang et al.

(10) Patent No.: US 12,548,561 B2
(45) Date of Patent: Feb. 10, 2026

(54) UNIVERSAL MONOLINGUAL OUTPUT LAYER FOR MULTILINGUAL SPEECH RECOGNITION

(71) Applicant: Google LLC, Mountain View, CA (US)

(72) Inventors: Chao Zhang, Mountain View, CA (US); Bo Li, Santa Clara, CA (US); Tara N. Sainath, Jersey City, NJ (US); Trevor Strohman, Mountain View, CA (US); Shuo-yiin Chang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 221 days.

(21) Appl. No.: 18/485,271

(22) Filed: Oct. 11, 2023

(65) Prior Publication Data
US 2024/0135923 A1    Apr. 25, 2024

Related U.S. Application Data

(60) Provisional application No. 63/379,401, filed on Oct. 13, 2022.

(51) Int. Cl.
*G10L 15/197*    (2013.01)
*G10L 15/00*    (2013.01)
*G10L 15/02*    (2006.01)

(52) U.S. Cl.
CPC .......... *G10L 15/197* (2013.01); *G10L 15/005* (2013.01); *G10L 15/02* (2013.01)

(58) Field of Classification Search
CPC ..... G10L 15/197; G10L 15/005; G10L 15/02; G10L 15/16

(Continued)

(56) References Cited

U.S. PATENT DOCUMENTS 5,995,918 A * 11/1999 Kendall ............... G06F 40/211
704/275
5,995,921 A * 11/1999 Richards ............... G06F 40/40
704/9

(Continued)

OTHER PUBLICATIONS

Zhang, Chao et al: "Streaming End-to-End Multilingual Speech Recognition with Joing Language Identification", arxiv.org, Cornell University Library, 201 Olin Library Cornell University Ithaca, NY 14853, Sep. 13, 2022 (Sep. 13, 2022) XP091316688.

(Continued)

*Primary Examiner* — Thuykhanh Le
(74) *Attorney, Agent, or Firm* — Honigman LLP; Brett A. Krueger; Grant Griffith

(57) ABSTRACT

A method includes receiving a sequence of acoustic frames as input to a multilingual automated speech recognition (ASR) model configured to recognize speech in a plurality of different supported languages and generating, by an audio encoder of the multilingual ASR, a higher order feature representation for a corresponding acoustic frame in the sequence of acoustic frames. The method also includes generating, by a language identification (LID) predictor of the multilingual ASR, a language prediction representation for a corresponding higher order feature representation. The method also includes generating, by a decoder of the multilingual ASR, a probability distribution over possible speech recognition results based on the corresponding higher order feature representation, a sequence of non-blank symbols, and a corresponding language prediction representation. The decoder includes monolingual output layer having a plurality of output nodes each sharing a plurality of language-specific wordpiece models.

34 Claims, 7 Drawing Sheets

(58) Field of Classification Search
USPC ............................................................ 704/8
See application file for complete search history.

(56) References Cited

U.S. PATENT DOCUMENTS

| | | | | |
|---|---|---|---|---|
| 6,961,954 | B1* | 11/2005 | Maybury | G11B 27/28 725/53 |
| 9,460,711 | B1* | 10/2016 | Vanhoucke | G10L 15/16 |
| 10,629,193 | B2* | 4/2020 | Ye | G10L 15/16 |
| 10,812,915 | B2* | 10/2020 | Santos | G10L 25/84 |
| 10,936,828 | B2* | 3/2021 | Le | G06F 40/242 |
| 10,964,309 | B2* | 3/2021 | Li | G06N 3/08 |
| 11,190,851 | B1* | 11/2021 | Palaniswami | G10L 15/005 |
| 12,002,451 | B1* | 6/2024 | Liu | G10L 15/16 |
| 2003/0012183 | A1* | 1/2003 | Butler | H04L 65/1043 370/467 |
| 2003/0161296 | A1* | 8/2003 | Butler | H04L 61/00 370/352 |
| 2010/0211376 | A1* | 8/2010 | Chen | G10L 15/187 704/250 |
| 2010/0223056 | A1* | 9/2010 | Kadirkamanathan | G10L 13/08 704/E15.005 |
| 2011/0035219 | A1* | 2/2011 | Kadirkamanathan | G10L 15/187 707/769 |
| 2014/0244254 | A1* | 8/2014 | Ju | G10L 15/063 704/243 |
| 2014/0278407 | A1* | 9/2014 | Chelba | G10L 15/197 704/235 |
| 2017/0011735 | A1* | 1/2017 | Kim | G10L 15/005 |
| 2019/0088257 | A1* | 3/2019 | Shah | G10L 15/22 |
| 2019/0189111 | A1* | 6/2019 | Watanabe | G06N 3/044 |
| 2019/0318725 | A1* | 10/2019 | Le Roux | G10L 17/00 |
| 2019/0355345 | A1* | 11/2019 | Fu | G10L 15/005 |
| 2020/0126538 | A1* | 4/2020 | Han | G10L 15/063 |
| 2020/0151252 | A1* | 5/2020 | Guo | G06F 40/30 |
| 2020/0349922 | A1* | 11/2020 | Peyser | G06N 3/09 |
| 2020/0349923 | A1* | 11/2020 | Hu | G10L 15/193 |
| 2020/0357387 | A1* | 11/2020 | Prabhavalkar | G06N 3/044 |
| 2020/0357388 | A1* | 11/2020 | Zhao | G10L 15/26 |
| 2020/0380215 | A1* | 12/2020 | Kannan | G06F 40/40 |
| 2021/0082437 | A1* | 3/2021 | Thomas | G10L 15/16 |
| 2021/0183373 | A1* | 6/2021 | Moritz | G06N 3/09 |
| 2021/0193125 | A1* | 6/2021 | Kim | G06N 3/09 |
| 2021/0233510 | A1* | 7/2021 | Datta | G10L 15/26 |
| 2021/0312905 | A1* | 10/2021 | Zhao | G10L 15/063 |
| 2022/0076668 | A1* | 3/2022 | Carbune | G10L 13/02 |
| 2022/0122581 | A1* | 4/2022 | Chen | G06N 3/047 |
| 2022/0139380 | A1* | 5/2022 | Meng | G06N 3/0442 704/232 |
| 2022/0199071 | A1* | 6/2022 | Voss | G10L 15/02 |
| 2022/0208179 | A1* | 6/2022 | Kurata | G10L 25/30 |
| 2022/0238104 | A1* | 7/2022 | Li | G10L 15/20 |
| 2022/0310067 | A1* | 9/2022 | Huang | G06N 3/04 |
| 2022/0310081 | A1* | 9/2022 | Gaur | G10L 15/22 |
| 2023/0096821 | A1* | 3/2023 | Huang | G10L 15/197 704/235 |
| 2023/0289536 | A1* | 9/2023 | Gaur | G06F 40/151 |
| 2023/0290345 | A1* | 9/2023 | Joshi | G06N 3/044 |
| 2023/0298570 | A1* | 9/2023 | Wang | G10L 15/063 704/232 |
| 2023/0306958 | A1* | 9/2023 | Zhang | G10L 15/16 |
| 2023/0316940 | A1* | 10/2023 | Le Chevalier | G06F 40/35 |
| 2023/0325612 | A1* | 10/2023 | Ghatage | G06F 40/263 |
| 2023/0335126 | A1* | 10/2023 | Huang | G10L 15/16 |
| 2023/0386507 | A1* | 11/2023 | Zhang | G10L 25/78 |
| 2023/0412760 | A1* | 12/2023 | Wang | G10L 15/04 |
| 2024/0029715 | A1* | 1/2024 | Rosenberg | G10L 15/16 |
| 2024/0096313 | A1* | 3/2024 | Danielescu | G10L 15/16 |
| 2024/0265924 | A1* | 8/2024 | Li | G10L 15/063 |
| 2025/0157459 | A1* | 5/2025 | Wang | G10L 15/16 |

OTHER PUBLICATIONS

Joshi, Vikas et al: "Multiple Softmax Architecture for Streaming Multilingual End-to-End ASR Systems", Interspeech 2021, Aug. 30, 2021 (Aug. 30, 2021), pp. 1767-1771, XP093110086, ISCA DOI: 10.21437/INTERSPEECH.2021-1298 URL:https://www.isca-speech.org/archive/pdfs/interspeech_2021/joshi21_interspeech.pdf.

Rao, Kanishka et al: "Exploring achitectures, data and unites for streaming end-to-end speech recognition with RNN-transducer", 2017 IEEE Automatic Speech Recognition and Understanding Workshop (ASRU), IEEE, Dec. 16, 2017 (Dec. 16, 2017), pp. 193-199, XP033306837, DOI: 10-1109/ASRU.2017.8268935.

Zhang, Chao et al: "UML: A Universal Monolingual Output Layer for Multilingual ASR", ICASSP 2023—2023 IEEE International Conference on Acoustics, Speech, and Signal Processing (ICASSP), IEEE, Jun. 4, 2023 (Jun. 4, 2023), pp. 1-5, XP034450001, DOI: 10-1109/ICASSP59357.2023.10096228.

International Search Report and Written Opinion for related PCT Application No. PCT/US2023/034972, dated Feb. 1, 2024.

* cited by examiner

UNIVERSAL MONOLINGUAL OUTPUT LAYER FOR MULTILINGUAL SPEECH RECOGNITION

CROSS REFERENCE TO RELATED APPLICATIONS

This U.S. Patent Application claims priority under 35 U.S.C. § 119(e) to U.S. Provisional Application 63/379,401, filed on Oct. 13, 2022. The disclosure of this prior application is considered part of the disclosure of this application and is hereby incorporated by reference in its entirety.

TECHNICAL FIELD

This disclosure relates to using a universal monolingual output layer for multilingual speech recognition.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g., a low word error rate (WER)) and latency (e.g., delay between a user speaking and the transcription) based on the ongoing development of deep neural networks. Despite a vase number of people being bilingual, many ASR models are only compatible with a single language. Other conventional ASR models are multilingual (i.e., compatible with multiple languages), but include significantly increased model sizes such that the conventional multilingual ASR models are not suitable for on-device applications that have certain storage and computing resource limitations.

SUMMARY

One aspect of the disclosure provides a multilingual automated speech recognition (ASR) model for recognizing speech in a plurality of different supported languages. The multilingual ASR model includes an audio encoder configured to receive a sequence of acoustic frames as input and generate, at each of a plurality of output steps, a higher order feature representation for a corresponding acoustic frame in the sequence of acoustic frames. The multilingual ASR model also includes a language identification (LID) predictor configured to receive the higher order feature representation generated by the audio encoder at each of the plurality of output steps as input and generate a language prediction representation at each of the plurality of output steps. The multilingual ASR model also includes a decoder that includes a monolingual output layer having a plurality of output nodes each sharing a plurality of language-specific wordpiece models. The decoder is configured to receive, as input, the higher order feature representation generated by the audio encoder at each of the plurality of output steps, a sequence of non-blank symbols output by the monolingual output layer, and the language prediction representation generated by the LID predictor at each of the plurality of output steps and generate a probability distribution over possible speech recognition results at each of the plurality of output steps.

Implementations of the disclosure may include one or more of the following optional features. In some implementations, each language of the plurality of different supported languages includes V number of wordpiece models, the monolingual output layer includes an input size equal to H, and the monolingual output layer includes a dimension equal to H×V. In some examples, each language-specific wordpiece model of the plurality of language-specific wordpiece models shared by each corresponding output node includes a language-specific wordpiece model corresponding to a respective language among the plurality of different supported languages that is different than the respective languages corresponding to the other language-specific wordpiece models shared by the corresponding output node. In these examples, each language-specific wordpiece model includes a respective wordpiece token vocabulary in a writing system corresponding to the respective language.

The sequence of acoustic frames received as input at the audio encoder may characterize an utterance spoken in at least one of the plurality of different supported languages. Here, the utterance may include a code-mixed utterance that includes one or more words spoken in a first language and one or more other words spoken in a second language. In some implementations, for each of the plurality of different supported languages, the plurality of output nodes of the monolingual output layer associate to corresponding language-specific wordpiece models for each of the plurality of different supported languages alphabetically.

In some examples, the monolingual output layer associates the same corresponding language-specific wordpiece model to share a same one of the plurality of output nodes when two or more of the plurality of different supported languages share a same corresponding language-specific wordpiece model. In these examples, an associating process may associate same language-specific wordpiece models shared by different languages to output nodes by identifying all language-specific wordpiece models across all of the plurality of different supported languages that are shared by two or more of the plurality of different languages and, for each corresponding language-specific wordpiece model identified as being shared by two or more of the plurality of different languages, indexing the corresponding language-specific wordpiece model from 1 to S where S denotes a number of the different languages that share the corresponding language-specific wordpiece model and assigning the corresponding language-specific wordpiece model to occupy a respective one of the plurality of output nodes for each of the S number of the different languages that share the corresponding language-specific wordpiece model. Here, for the corresponding language-specific wordpiece model assigned to occupy the respective one of the plurality of output nodes for each of the S number of different languages, the associating process may merge the corresponding language-specific wordpiece model indexed from 1 to S into a single language-specific wordpiece model shared by each of the S number of the different languages.

In some examples, the language prediction representation received as input at the decoder at each of the plurality of output steps represents a probability distribution over possible languages among the plurality of different supported languages that is predicted for a corresponding acoustic frame in the sequence of acoustic frames and the decoder generates the probability distribution over possible speech recognition results at each of the plurality of output steps only over the language-specific wordpiece models that correspond to the top-K languages in the probability distribution over possible languages represented by the language prediction representation at the corresponding output step. In these examples, K may be less than a total number of the different supported languages and K includes a frame-dependent variable that adapts. The monolingual output layer may perform beam-searching over a top N candidate hypotheses selected from the probability distribution over possible speech recognition results at each of the plurality of output steps.

In some implementations, the decoder further includes: a prediction network configured to receive, as input, the sequence of non-blank symbols output by the monolingual output layer and the language prediction representation generated by the LID predictor at each of the plurality of output steps and generate a dense representation at each of the plurality of output steps; and a joint network configured to receive, as input, the dense representation generated by the prediction network at each of the plurality of output steps, the higher order feature representation generated by the audio encoder at each of the plurality of output steps, and the language prediction representation generated by the LID predictor at each of the plurality of output steps and generate the probability distribution over possible speech recognition results at each of the plurality of output steps. In these implementations, the joint network may include a combination structure that stacks gating and bilinear pooling to fuse the dense representation generated by the prediction network and the higher feature representation generated by the audio encoder.

In some examples, the audio encoder includes a cascaded encoder that includes: a first encoder configured to receive the sequence of acoustic frames as input and generate a first higher order feature representation for a corresponding acoustic frame in the sequence of acoustic frames at each of the plurality of output steps; a second encoder configured to receive, as input, the first higher order feature representation generated by the first encoder at each of the plurality of output steps and generate a second higher order feature representation for a corresponding first higher feature representation at each of the plurality of output steps; and the LID predictor is further configured to receive, as input, a concatenation of the first higher order feature representation generated by the first encoder at each of the plurality of output steps and the second higher order feature representation generated by the second encoder at each of the plurality of output steps and generate the language prediction representation at each of the plurality of output steps. In other examples, the audio encoder includes a cascaded encoder including a first encoder and a second encoder. In these other examples: the first encoder is configured to receive the sequence of acoustic frames as input and generate a first higher order feature representation for a corresponding acoustic frame in the sequence of acoustic frames at each of the plurality of output steps; the LID predictor is configured to receive, as input, the first higher order feature representation generated by the first encoder at each of the plurality of output steps and generate the language prediction representation at each of the plurality of output steps; and the second encoder is configured to receive, as input, a concatenation of the first higher order feature representation generated by the first encoder at each of the plurality of output steps and the language prediction representation generated by the language ID predictor at each of the plurality of output steps and generate a second higher order feature representation for a corresponding first higher order feature representation.

Another aspect of the disclosure provides a computer-implemented method that when executed on data processing hardware causes the data processing hardware to perform operations for using a monolingual output layer for multilingual speech recognition. The operations include receiving a sequence of acoustic frames as input to a multilingual automated speech recognition (ASR) model configured to recognize speech in a plurality of different supported languages. The operations also include generating, by an audio encoder of the multilingual ASR model, at each of a plurality of output steps, a higher order feature representation for a corresponding acoustic frame in the sequence of acoustic frames. The operations also include generating, by a language identification (LID) predictor of the multilingual ASR model, at each of the plurality of output steps, a language prediction representation for a corresponding higher order feature representation generated by the audio encoder. The operations also include generating, by a decoder of the multilingual ASR model, at each of the plurality of output steps, a probability distribution over possible speech recognition results. The decoder includes a monolingual output layer that has a plurality of output nodes each sharing a plurality of language-specific wordpiece models. Here, the probability distribution over possible speech recognition results is based on the corresponding higher order feature representation generated by the audio encoder, a sequence of non-blank symbols output by the monolingual output layer, and a corresponding language prediction representation generated by the LID predictor.

Implementations of the disclosure may include one or more of the following optional features. In some implementations, each language of the plurality of different supported languages includes V number of wordpiece models, the monolingual output layer includes an input size equal to H, and the monolingual output layer includes an input size equal to H. In some examples, each language-specific wordpiece model of the plurality of language-specific wordpiece models shared by each corresponding output node includes a language-specific wordpiece model corresponding to a respective language among the plurality of different supported languages that is different than the respective languages corresponding to the other language-specific wordpiece models shared by the corresponding output node. In these examples, each language-specific wordpiece model includes a respective wordpiece token vocabulary in a writing system corresponding to the respective language.

The sequence of acoustic frames received as input at the audio encoder may characterize an utterance spoken in at least one of the plurality of different supported languages. Here, the utterance may include a code-mixed utterance that includes one or more words spoken in a first language and one or more other words spoken in a second language. In some examples, for each of the plurality of different supported languages, the plurality of output nodes of the monolingual output layer associate to corresponding language-specific wordpiece models for each of the plurality of different supported languages alphabetically.

In some implementations, the operations further include associating, by the monolingual output layer, the same corresponding language-specific wordpiece model to share a same one of the plurality of output nodes when two or more of the plurality of different supported languages share a same corresponding language-specific wordpiece model. In these implementations, the monolingual output layer may associate same language-specific wordpiece models shared by different languages to output nodes by: identifying all language-specific wordpiece models across all of the plurality of different supported languages that are shared by two or more of the plurality of different languages; and, for each corresponding language-specific wordpiece model identified as being shared by two or more of the plurality of different languages, indexing the corresponding language-specific wordpiece model from 1 to S, wherein S denotes a number of the different languages that share the corresponding language-specific wordpiece model and assigning the corresponding language-specific wordpiece model to occupy a respective one of the plurality of output nodes for each of the S number of the different languages that share the corresponding language-specific wordpiece model. For the corresponding language-specific wordpiece model assigned to occupy the respective one of the plurality of output nodes for each of the S number of different languages, the monolingual output layer may merge the corresponding language-specific wordpiece model indexed from 1 to S into a single language-specific wordpiece model shared by each of the S number of the different languages.

In some examples, the language prediction representation generated by the LID predictor at each of the plurality of output steps represents a probability distribution over possible languages among the plurality of different supported languages that is predicted for a corresponding acoustic frame in the sequence of acoustic frames and generating the probability distribution over possible speech recognition results includes generating the probability distribution over possible speech recognition results only over the language-specific wordpiece models that correspond to the top-K languages in the probability distribution over possible languages represented by the corresponding language prediction representation. In these examples, K may be less than a total number of the different supported languages and K includes a frame-dependent variable that adapts. The operations may further include performing, by the monolingual output layer, beam-searching over a top N candidate hypotheses selected from the probability distribution over possible speech recognition results at each of the plurality of output steps.

In some implementations, the operations further include generating, by a prediction network of the decoder, at each of the plurality of output steps, a dense representation based on the sequence of non-blank symbols output by the monolingual output layer and the corresponding language prediction representation generated by the LID predictor and generating, by a joint network of the decoder, at each of the plurality of output steps, the probability distribution over possible speech recognition results based on a corresponding dense representation generated by the prediction network, the corresponding higher order feature representation generated by the audio encoder, and the corresponding language prediction representation generated by the LID predictor. In these implementations, the joint network may include a combination structure that stacks gating and bilinear pooling to fuse the dense representation generated by the prediction network and the higher feature representation generated by the audio encoder.

In some examples, the audio encoder includes a cascaded encoder and the operations further include: generating, by a first encoder of the cascaded encoder, at each of the plurality of output steps, a first higher order feature representation for the corresponding acoustic frame in the sequence of acoustic frames; and generating, by a second encoder of the cascaded encoder, at each of the plurality of output steps, a second higher order feature representation for a corresponding first higher feature representation. Here, generating the language prediction representation for the corresponding higher order feature representation is based on a concatenation of the corresponding first higher order feature representation generated by the first encoder and a corresponding second higher order feature representation generated by the second encoder. In other examples, the audio encoder includes a cascaded encoder and the operations further include: generating, by a first encoder of the cascaded encoder, at each of the plurality of output steps, a first higher order feature representation for the corresponding acoustic frame in the sequence of acoustic frames; and generating, by a second encoder of the cascaded encoder, at each of the plurality of output steps, a second higher order feature representation based on a concatenation of a corresponding first higher order feature representation generated by the first encoder and the corresponding language prediction representation generated by the language ID predictor. Here, generating the language prediction representation for the corresponding higher order feature representation is based on a corresponding first higher order feature representation generated by the first encoder.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
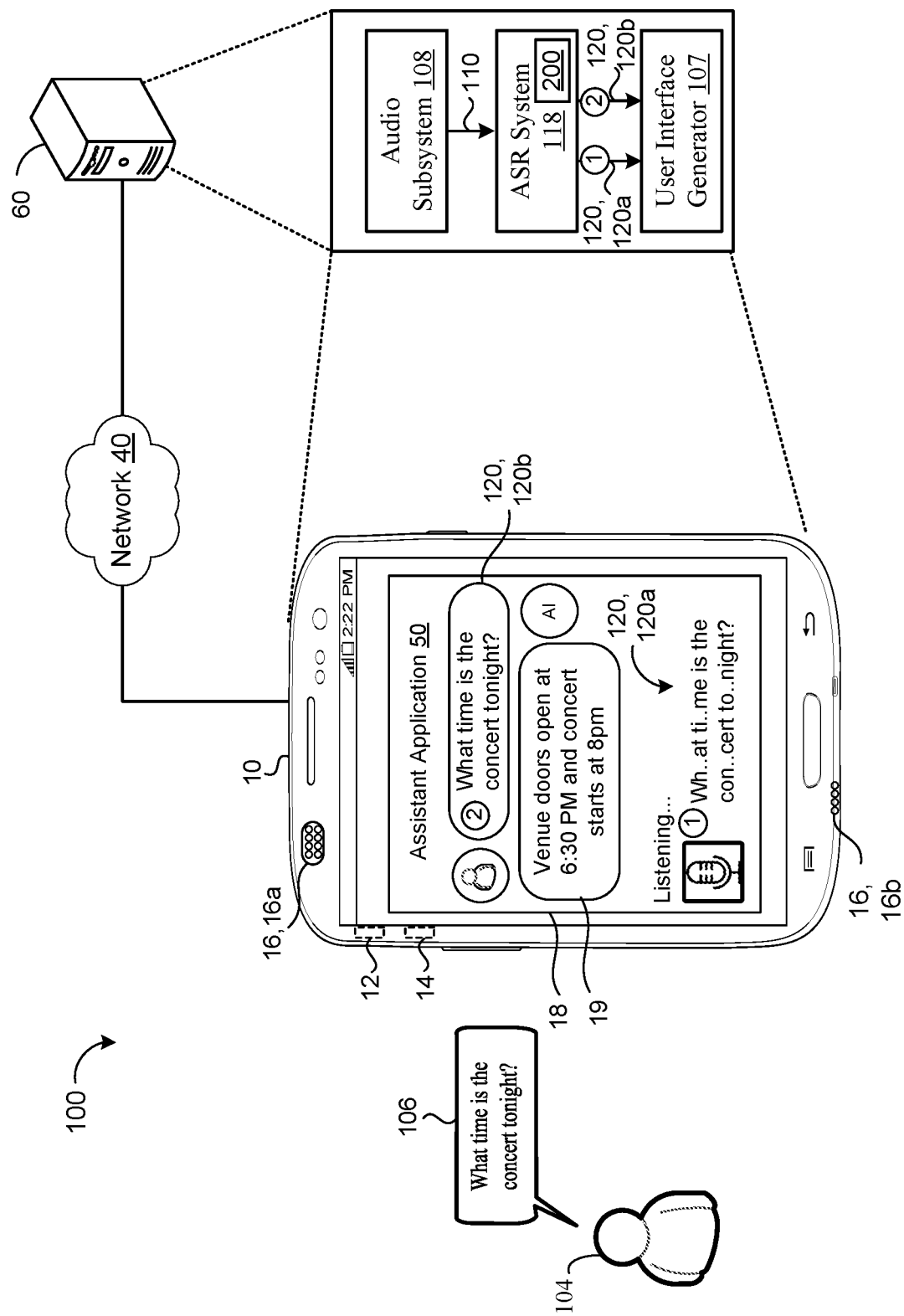
FIG. 1 is a schematic view of an example speech recognition system.

Automatic speech recognition (ASR), the process of taking an audio input and transcribing it into text, is a feature included in various computing devices and is used by a significant number of people. Yet, only about 100 of the most common spoken languages have suitable ASR models for recognizing speech even though approximately 7,000 languages are actively spoken in the world. Using a single multilingual ASR model that is compatible with a plurality of spoken languages (e.g., rather than multiple monolingual ASR models) is beneficial because of the capability of the multilingual ASR to recognize code-switch utterances (e.g., a single utterance that has at least two different spoken languages) and the reduced workload of maintaining a single ASR model.

Many end-to-end ASR models use wordpiece models that recognize speech in word or wordpiece segments to optimize ASR performance in monolingual speech scenarios. However, it is impractical to use a large number of multilingual wordpiece models in multilingual scenarios where multiple different texts (i.e., alphabetic characters) are involved. To that end, conventional systems use a separate monolingual output layer and decoder for each of the different languages that the ASR model is configured to recognize. A major drawback of these conventional systems is that using separate monolingual output layers for each language considerably increases the storage and computational resources consumed by the ASR model and requires management of more concurrent beam search processes increasing the number of languages. In particular, the increased storage and computational resources results in the conventional multilingual ASR models unsuitable for many on-device applications.

Accordingly, implementations herein are directed towards a multilingual ASR model and method for recognizing speech in a plurality of different supported languages. In particular, the multilingual ASR model receives, as input, a sequence of acoustic frames and an audio encoder of the multilingual ASR model generates a higher order feature representation for a corresponding acoustic frame. Moreover, a language identification (LID) predictor of the multilingual ASR model generates a language prediction representation for a corresponding higher order feature representation. The multilingual ASR model also includes a monolingual output layer having a plurality of output nodes each sharing a plurality of language-specific wordpiece models. The decoder generates a probability distribution over possible speech recognition results based on the corresponding higher order feature representation, a sequence of non-blank symbols output by the monolingual output layer, and a corresponding language prediction representation.

Advantageously, the monolingual output layer enables the multilingual ASR model to recognize speech in multiple different languages while only using a single output layer. In contrast, conventional systems use multiple different output layers for each of the different languages compatible with the ASR model. As a result, the monolingual output layer allows the multilingual ASR model to easily scale to recognize any number of languages without increasing (or minimally increasing) the output layer size. The smaller size of the monolingual output layer improves resource efficiency of the multilingual ASR model during both training and interference and reduces the difficulty to adapt the multilingual ASR model to new languages by reusing the same monolingual output layer.

FIG. 1 is an example system 100 that includes a user device 10 whereby one or more users 104 may interact with the user device 10 through voice input. The user device 10 (also referred to generally as a device 10) is configured to capture sounds (e.g., streaming audio data) spoken by the one or more users 104. Here, the streaming audio data may refer to an utterance 106 spoken by the user 104 that functions as an audible query, a command for the user device 10, or an audible communication captured by the device 10. Speech-enabled systems of the user device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions that, when executed by the data processing hardware 12, cause the data processing hardware 12 to perform one or more operations. The user device 10 further includes an audio system 16 with an audio capture device (e.g., microphone) 16, 16a for capturing and converting the utterances 106 into electrical signals and a speech output device (e.g., a speaker) 16, 16b for outputting an audible audio signal (e.g., as output data from the user device 10). The user device 10 may implement an array of audio capture devices 16a without departing from the scope of the present disclosure, whereby one or more capture devices 16a in the array may not physically reside on the user device 10, but be in communication with the audio system 16.

The system 100, includes an automated speech recognition (ASR) system 118 that implements an ASR model 200 and resides on the user device 10 of the user 104 and/or on a remote computing device 60 (e.g., one or more remote servers of a distributed system executing in a cloud-computing environment) in communication with the user device 10 via a network 40. In some examples, the ASR model 200 may be a recurrent neural network-transducer (RNN-T) model. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user 104 speaks a respective utterance 106 and the audio subsystem 108 converts the utterance 106 into corresponding audio data (e.g., sequence of acoustic frames) 110 for input to the ASR system 118. Thereafter, the ASR model 200 receives, as input, the sequence of acoustic frames 110 corresponding to the utterance 106, and generates/predicts, at each output step, a corresponding transcription 120 (e.g., speech recognition result/hypothesis) of the utterance 106 as the ASR model 200 receives (e.g., processes) each acoustic frame 110 in the sequence of acoustic frames 110.

In the example shown, the ASR model 200 may perform streaming speech recognition to produce an initial speech recognition result 120, 120a and generate a final speech recognition result 120, 120b by improving the initial speech recognition result 120a. The speech recognition results 120 may either correspond to a partial speech recognition result or an entire speech recognition result. Stated differently, the speech recognition result 120 may either correspond to a portion of an utterance 106 or an entire utterance 106. For example, the partial speech recognition result may correspond to a portion of a spoken utterance or even a portion of a spoken term. However, as will become apparent, the ASR model 200 performs additional processing on the final speech recognition result 120b whereby the final speech recognition result 120b may be delayed from the initial speech recognition result 120a.

The user device 10 and/or the remote computing device 60 also execute a user interface generator 107 configured to present a representation of the transcription 120 of the utterance 106 to the user 104 of the user device 10. As described in greater detail below, the user interface generator 107 may display the initial speech recognition results 120a in a streaming fashion during time 1 and subsequently display the final speech recognition results 120b in a streaming fashion during time 2. Notably, the ASR model 200 outputs the final speech recognition results 120b in a streaming fashion even though the final speech recognition results 120b improve upon the initial speech recognition result 120a. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by the audio system 16 of the user device 10. In this example, the audio system 16 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the initial speech recognition results 120a. During time 1, the user interface generator 107 presents, via the digital assistant interface 18, a representation of the initial speech recognition results 120a of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the final speech recognition results 120b of the utterance 106 to the user 104 of the user device 10 in a streaming fashion such that words, word pieces, and/or individual characters appear on the screen as soon as they are generated by the ASR model 200. In some implementations, the user interface generator 107 replaces the representation of the initial speech recognition results 120a presented at time 1 with the representation of the final speech recognition results 120b presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition results 120a at an earlier time than the final speech recognition results 120b. For instance, as the final speech recognition result 120b is presumed to be more accurate than the initial speech recognition result 120a, the final speech recognition result 120b ultimately displayed as the transcription 120 may fix any terms that may have been misrecognized in the initial speech recognition results 120a. In this example, the streaming initial speech recognition results 120a output by the ASR model 200 are displayed on the screen of the user device 10 at time 1 are associated with low latency and provide responsiveness to the user 104 that his/her query is being processed, while the final speech recognition result 120b output by the ASR model 200 and displayed on the screen at time 2 leverages an additional speech recognition model and/or a language model to improve the speech recognition quality in terms of accuracy, but at increased latency. However, since the initial speech recognition results 120a are displayed as the user speaks the utterance 106, the higher latency associated with producing, and ultimately displaying the final speech recognition results 120b is not noticeable to the user 104.

In the example shown in FIG. 1, the digital assistant application 50 may respond to the question posed by the user 104 using natural language processing. Natural language processing generally refers to a process of interpreting written language (e.g., the initial speech recognition result 120a and/or the final speech recognition result 120b) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote computing device 60 in communication with the data processing hardware 12 of the user device 10.

Figure 2A:
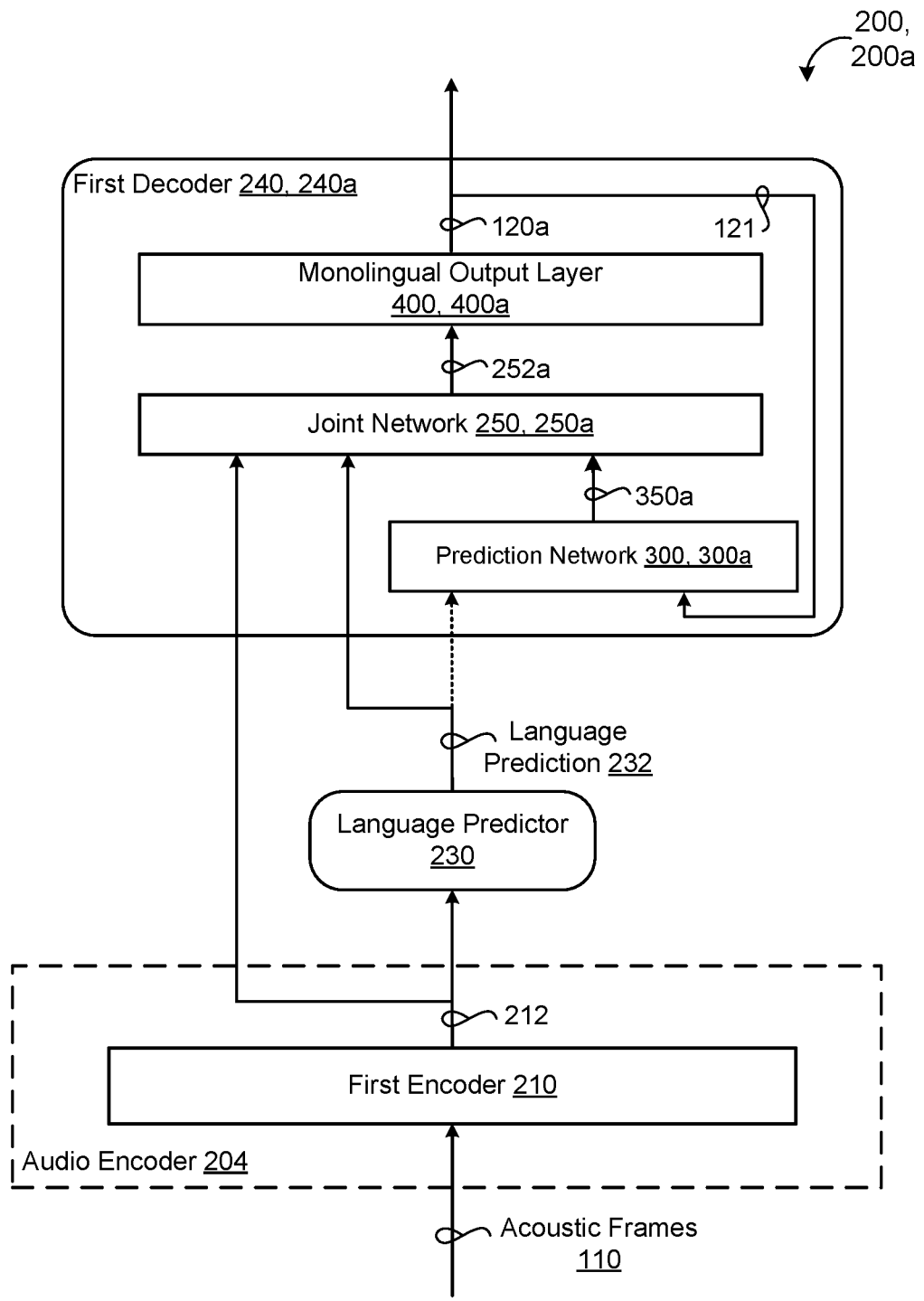
FIGS. 2A and 2B are schematic views of example speech recognition models.
Figure 2B:
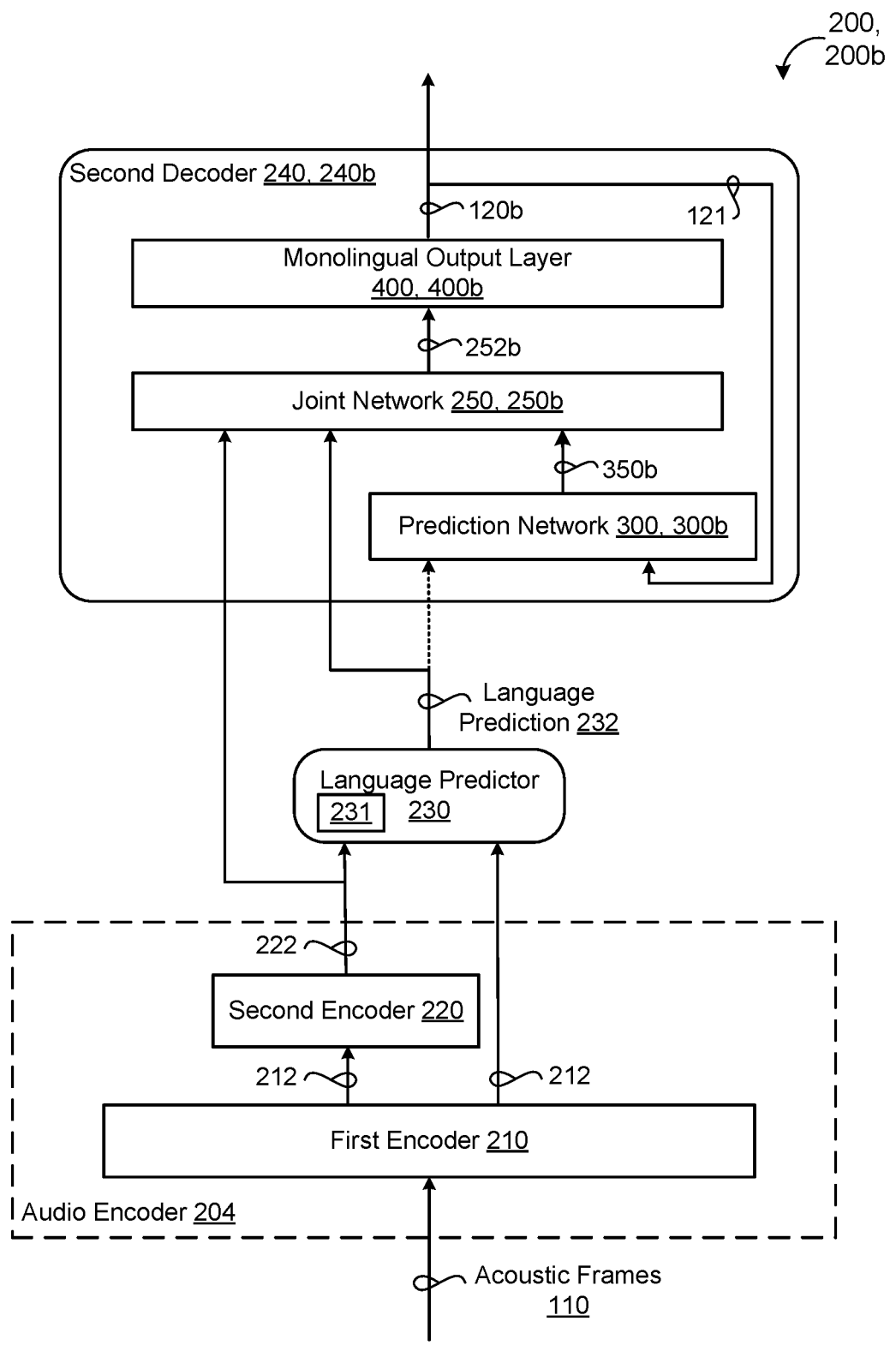

Referring now to FIGS. 2A and 2B, in some implementations, the ASR model 200 includes an audio encoder 204, a language identification (LID) predictor 230, and a decoder 240. The audio encoder 204 is configured to receive, as input, the sequence of acoustic frames 110 and generate, at each of a plurality of output steps, a higher order feature representation 212, 222 for a corresponding acoustic frame 110 in the sequence of acoustic frames 110. The sequence of acoustic frames 110 received as input at the audio encoder 204 characterize an utterance spoken in at least one of the plurality of different supported languages. In some examples, the utterance includes a code-mixed utterance that includes one or more words spoken in a first language and one or more other words spoken in a second language different than the first language. For example, the code-mixed utterance may include "donde esta the restaurant?" whereby "donde esta" is spoken in Spanish and "the restaurant" is spoken in English.

The LID predictor 230 is configured to receive, as input, the higher order feature representation 212, 222 generated by the audio encoder 204 at each of the plurality of output steps and generate, at each of the plurality of output steps, a language prediction representation 232 representing a predicted spoken language of the corresponding acoustic frame 110. The language prediction representation 232 generated by the LID predictor 230 may represent a probability distribution over possible languages among the plurality of different supported languages that is predicted for a corresponding acoustic frame 110 in the sequence of acoustic frames. For instance, the probability distribution of the language prediction representation 232 may indicate that a corresponding acoustic frame 110 has a 0.3 likelihood value of being spoken in Spanish and a 0.7 likelihood value of being spoken in English. In some examples, the LID predictor 230 generates the language prediction representation 232 on a per-frame basis. In these examples, the spoken utterance may include multiple words/terms and the LID predictor 230 generates the language prediction representation 232 for each acoustic frame 110 in the sequence of acoustic frames 110. For example, for a first portion of the sequence of acoustic frames 110 the language prediction representation 232 may indicate a first language was spoken while for a second portion of the sequence of acoustic frames 110 the language prediction representation 232 indicates a second language was spoken.

The decoder 240 receives the higher order feature representation 212, 222 generated by the audio encoder 204 and the language prediction representation 232 generated by the LID predictor 230. In some examples, the decoder 240 includes a joint network 250, a prediction network 300, and a monolingual output layer 400. The decoder 240 is configured to receive, as input, the higher order feature representation 212, 222 generated by the audio encoder 204 at each of the plurality of output steps, a sequence of non-blank symbols output by the monolingual output layer 400, and the language prediction representation 232 generated by the LID predictor 230 at each of the plurality of output steps and generate, at each of the plurality of output steps, a corresponding speech recognition result 120.

More specifically, the joint network 250 is configured to receive, as input, a dense representation 350 generated by the prediction network 300 and the higher order feature representation 212, 222 generated by the audio encoder 204 and generate, at each output step, the probability distribution 252 over possible speech recognition results for a corresponding acoustic frame 110. Here, the possible speech recognition results may include a top N candidate hypotheses from the probability distribution 252. The joint network may include a combination structure that stacks gating and bilinear pooling to fuse the dense representation 350 generated by the prediction network 300 and the higher order feature representation 212, 222 generated by the audio encoder 204. As will become apparent, the joint network 250 may generate the probability distribution 252 over possible speech recognition results only over language-specific wordpiece models 420 (FIG. 4) that correspond to the top-K languages in the probability distribution 252 over possible languages represented by the language prediction representation 232 at the corresponding output step. Here, K may include a frame-dependent variable that adapts whereby K is less than a total number of the different supported languages of the ASR model 200 (FIGS. 2A and 2B). That is, K may adapt based on each acoustic frame 110 in the sequence of acoustic frames 110. Described in greater detail with reference to FIG. 4, the monolingual output layer 400 receives the probability distribution over possible speech recognition hypotheses generated by the joint network 250 and outputs a corresponding speech recognition result 120. That is, the monolingual output layer 400 may perform beam-searching over the top N candidate hypotheses selected from the probability distribution 252 over possible speech recognition results at each of the plurality of output steps to generate the speech recognition result 120. Thus, the ASR model 200 generates the speech recognition result 120 according to:

$$y^* = \text{argmax } P(y|x) = \Sigma_z P(z|x) P(y|x,z) \quad (1)$$

In Equation 1, x represents a corresponding acoustic frame 110 from the sequence of acoustic frames 110, y represents the output (e.g., probability distribution 252), z represents the language prediction representation 232, and y* represents the decoding result (e.g., speech recognition result 120).

Here, the "possible speech recognition results/hypotheses" correspond to a set of output labels/symbols/tokens (also referred to as "speech units") each representing a grapheme (symbol/character) or a wordpiece in a specified natural language(s). The output labels may be multilingual such that a first possible speech recognition result from the probability distribution 252 is in a first language and a second possible speech recognition result from the probability distribution 252 is in a second language. For example, when the natural language is English, the set of output labels may include twenty-seven (27) symbols, e.g., one label for each of the 26-letters in the English alphabet and one label designating a space. Accordingly, the joint network 250 may output a set of values indicative of the likelihood of occurrence of each of a predetermined set of output labels. The set of values can be a vector (e.g., a one-hot vector) and can indicate a probability distribution over the set of output labels. In some scenarios, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The probability distribution 252 of the joint network 250 may include a posterior probability value for each of the different output labels. Thus, if there are 100 different output labels representing different graphemes or other symbols, the output of the joint network 250 can include 100 different probability values, one for each output label. In some examples, the joint network 250 selects the top N possible speech recognition hypotheses having the highest probabilities as output for the probability distribution 252 whereby the monolingual output layer 400 performs beam-searching over the top N possible speech recognition hypotheses to generate the speech recognition result 120.

In some implementations, the prediction network 300 is configured to receive, as input, a sequence of non-blank symbols 121 (e.g., non-blank symbols of the speech recognition result 120) output by the monolingual output layer 400 and generate, at each output step, a dense representation 350 for a corresponding acoustic frame 110 based on the sequence of non-blank symbols 121 generated based on a previous acoustic frame 110. Optionally, the prediction network 300 may receive the language prediction representation 232 (e.g., denoted by the dashed line) generated by the LID predictor 230 such that the prediction network 300 generates the dense representation 350 based on the sequence of non-blank symbols 121 and the language prediction representation 232. The prediction network 300 outputs the dense representation 350 to the joint network 250 such that the joint network 250 generates a subsequent probability distribution 252 using the dense representation 350 based on prior acoustic frames 110.

Figure 4:
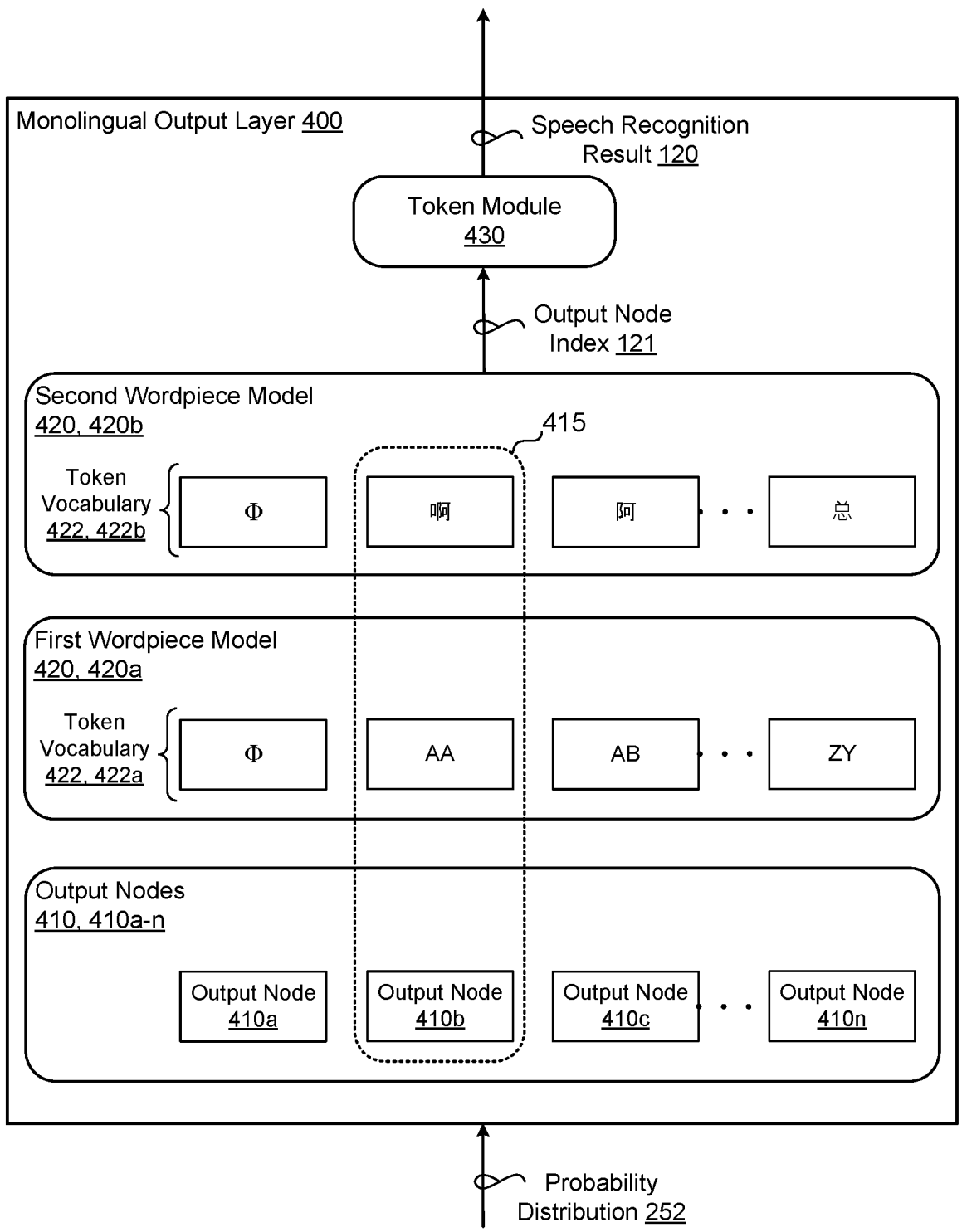
FIG. 4 is a schematic view of an example universal monolingual output layer of the example speech recognition models of FIGS. 2A and 2B.

Referring now to FIG. 4, the monolingual output layer 400 is shared by all supported languages of the multilingual ASR model 200. That is, the monolingual output layer 400 is a single output layer used for each of the multiple different supported languages compatible with the ASR model 200 (FIGS. 2A and 2B). Advantageously, using the single monolingual output layer 400 for multiple different languages enables speech recognition for the multiple different supported languages while still minimizing the consumption of storage and computing resources as compared to conventional systems that use a unique output layer for each one of the different languages.

The monolingual output layer 400 has a plurality of output nodes 410, 410a-n where each output node 410 shares a plurality of language-specific wordpiece models 420, 420a-n. In some implementations, L represents a number of supported languages compatible with the ASR model 200 (FIGS. 2A and 2B), $V_l$ represents a number wordpiece models for the l-th language (e.g., each language of the plurality of different supported languages includes V number of wordpiece models), the monolingual output layer 400 includes an input size equal to H, and the monolingual output layer includes a dimension equal to H×V. As such, each output node 410 of the monolingual output layer 400 is mapped to L different language-specific wordpiece models 420 (e.g., $W_{L,o}, \ldots, W_{L,o}$). Accordingly, the monolingual output layer 400 uses only one H×max($V_1, \ldots, V_L$)-dimensional output layer to model a number of language-specific wordpiece models 420 represented by $\Sigma_{l=1}^{L} V_l$. In stark contrast, for conventional systems, each output node is mapped to only one wordpiece model. While implementations herein consider the monolingual output layer 400 including language-specific wordpiece models 420, it is understood other models may be used, for example, grapheme or phoneme models.

In the example shown, the monolingual output layer 410 has three (3) output nodes 410a-c each sharing two (2) language-specific wordpiece models 420a, 420b. The example shows three output nodes 410 and two language-specific wordpiece models 420 for the sake of clarity only, as the plurality of output nodes 410 may include any number of output nodes 410 and the plurality of language-specific wordpiece models 420 may include any number of language-specific wordpiece models 420. For example, the plurality of output nodes 410 may include 4,000 output nodes 410 and the plurality of language-specific wordpiece models 420 may a respective language-specific wordpiece models 420 for each of 11 different languages. Each language-specific wordpiece model 420 corresponds to a respective language among the plurality of different supported languages that is different than the respective languages corresponding to the other language-specific wordpiece models 420. Moreover, each language-specific wordpiece model 420 includes a respective wordpiece token vocabulary 422 in a writing system corresponding to the respective language. Continuing with the example shown, the first language-specific wordpiece model 420a corresponds to the English language and the second language-specific wordpiece model 420b corresponds to the Chinese language. Moreover, in the example shown, the first language-specific wordpiece model 420a (i.e., English wordpiece model) includes a first respective wordpiece token vocabulary 422, 422a in a writing system corresponding to the English language and the second language-specific wordpiece model 420b (i.e., Chinese wordpiece model) includes a second respective wordpiece token vocabulary 422, 422b in a writing system corresponding to the Chinese language.

In some examples, the plurality of output nodes 410 of the monolingual output layer 400 associate to corresponding language-specific wordpiece models 420 for each of the plurality of different supported languages alphabetically. For instance, the monolingual output layer 400 associates the first output node 410a to a blank symbol "Φ" from the respective wordpiece token vocabulary 422 of each language-specific wordpiece model 420. Here, the blank symbol "Φ" represents a lowest alphabetic value. In the example shown, the monolingual output layer 400 associates first output node 410a to the blank symbol "Φ" from the first and second wordpiece token vocabularies 422a, 422b by aligning the first output node 410 to the blank symbol "Φ" from each of the first and second wordpiece token vocabularies 422a, 422b. Moreover, the monolingual output layer 400 associates each subsequent output node 410 to a corresponding wordpiece token from the wordpiece token vocabulary 422 of each language-specific wordpiece model 420 alphabetically. For instance, in the example shown, the monolingual output layer 400 associates the second output node 410b to the wordpiece token "AA" from the first wordpiece token vocabulary 422a and to the wordpiece token "啊" from the second wordpiece token vocabulary 422b. Continuing with the example shown, the monolingual output layer 400 associates the third output node 410c to the wordpiece token "AB" from the first wordpiece token vocabulary 422a and to the wordpiece token "阿" from the second wordpiece token vocabulary 422b, and associates the nth output node 410n to the wordpiece token "ZY" from the first wordpiece token vocabulary 422a and to the wordpiece token "息" from the second wordpiece token vocabulary 422b. In short, as a numerical value associated with each output node 410 increases, so does the associated alphabetic representation of the wordpiece token from the respective wordpiece token vocabulary 422. Referring again to the example shown, the second output node 410b is associated with the English wordpiece "AB" which has a lower alphabetic value than the English wordpiece "ZY" associated with the nth output node 410n.

In some implementations, the monolingual output layer 400 shares a same corresponding language specific wordpiece model 420 for languages with similar writing systems. In these implementations, the monolingual output layer 400 may no longer be explicitly monolingual because a single language-specific wordpiece model 420 may be shared among two or more languages with similar writing systems. For example, the English language and French language have similar writing systems (e.g., similar wordpiece token vocabularies 422) such that the monolingual output layer 400 may share a same corresponding language specific wordpiece model 420 for the English language and the French language. Yet, some languages have the same or similar writing systems but dissimilar pronunciations and contexts, such as the same characters in the Chinese language and the Japanese language. Thus, languages with similar writing systems but dissimilar pronunciations and contexts maintain separate respective language-specific wordpiece models 420.

To that end, when two or more of the plurality of different supported languages of the multilingual ASR model 200 share a same corresponding language-specific wordpiece model 420, the monolingual output layer 400 may associate the same corresponding language-specific wordpiece model 420 to share a same one of the plurality of output nodes 410. For example, the monolingual output layer 400 may associate each corresponding wordpiece token from respective wordpiece token vocabularies 422 of the English and French language to share a same one of the plurality of output nodes. That is, in this example, the wordpiece token of "AA" from the English and French language may share the same one of the plurality of output nodes 410.

In particular, the monolingual output layer 400 may use an associating process that associates the same language-specific wordpiece models 420 shared by different languages to output nodes 410 by identifying all language-specific wordpiece models 420 across all of the plurality of different supported languages that are shared by two or more of the plurality of different languages. Thereafter, for each corresponding language-specific wordpiece model 420 identified as being shared by two or more of the plurality of different languages, the associating process indexes the corresponding language-specific wordpiece model 420 from 1 to S whereby S denotes a number of the different languages that share the corresponding language-specific wordpiece model 420 and assigns the corresponding language-specific wordpiece model 420 to occupy a respective one of the plurality of output nodes 410 for each of the S number of the different languages that share the corresponding language-specific wordpiece model 420. Here, for the corresponding language-specific wordpiece model 420 assigned to occupy the respective one of the plurality of output nodes 410 for each of the S number of different languages, the associating process merges the corresponding language-specific wordpiece model 420 indexed from 1 to S into a single language-specific wordpiece model 420 shared by each of the S number of the different languages. For example, the associating process merges the language-specific wordpiece models 420 for English and French into a single language-specific wordpiece model 420.

Accordingly, the monolingual output layer 400 receives, as input, the probability distribution 252 over possible speech recognition results generated by the joint network 250 and generates, at each of the output steps, the speech recognition result 120 for a corresponding acoustic frame 110. In particular, for each possible speech recognition result from the probability distribution 252, the monolingual output layer 400 determines an output node index 415 indicating a respective one of the output nodes 410 and the associated language-specific wordpiece models 420. In the example shown, the monolingual output layer 400 determines the output node index 415 indicating the second output node 410b and the associated wordpiece tokens "AA" and "啊" from the first wordpiece token vocabulary 422a and the second wordpiece token vocabulary 422b, respectively, for a corresponding acoustic frame 110. Simply put, the probability distribution 252 for the corresponding acoustic frame 110 may indicate speech recognition results of "AA" and "啊" for the corresponding acoustic frame 110. Notably, at the current output step in the example shown, the ASR model 200 (FIGS. 2A and 2B) may not definitely know which language (e.g., English or Chinese) is represented by the corresponding acoustic frame 110 such that the monolingual output layer 400 outputs the output node index 415 representing wordpiece tokens for both English and Chinese wordpieces. Thus, as the ASR model 200 continues to process subsequent acoustic frames 110 (e.g., process additional context from the sequence of acoustic frames 110), the ASR model 200 may increase a confidence of what language was spoken for prior acoustic frame 110.

Advantageously, because the monolingual output layer 400 output the output node index 415 at each output step, the monolingual output layer 400 may tokenize the possible speech recognition results using either the first wordpiece token vocabulary 422a or the second wordpiece token vocabulary. For example, the monolingual output layer 400 may receive a respective probability distribution 252 for a corresponding acoustic frame 110 indicating a 0.5 likelihood value the speech recognition result is "hello" in English and a 0.5 likelihood value the speech recognition result is "你好" in Chinese (e.g., "hello" in Chinese). Notably, at the current output step of this example, the ASR model 200 is not confident which possible speech recognition result is correct for the corresponding acoustic frame 110. Moreover, the output node index (e.g., sequence of non-blank symbols) 121 output by the monolingual output layer 400 includes a respective one of the output nodes 410 is associated with a respective wordpiece token of "hello" from the wordpiece token vocabulary 422 of the English wordpiece model and a respective wordpiece token of "你好" from the wordpiece token vocabulary 422 of the Chinese wordpiece model. Thereafter, the ASR model 200 processes additional acoustic frames 110 after the corresponding acoustic frame 110 to determine that the corresponding acoustic frame 110 (e.g., prior to the additional acoustic frames 110) was spoken in English based on a context of possible speech recognition results of the additional acoustic frames 110. As such, the monolingual output layer 400 may use the output node index 121 of the corresponding acoustic frame 110 (e.g., "hello" in English and "你好" in Chinese) and tokenize the speech recognition result 120 as "hello" based on determining that the corresponding acoustic frame 110 was spoken in English.

In particular, the monolingual output layer 400 only interprets output node indexes 415 according to the determined language, which can be achieved by switching among a set of monolingual wordpiece token vocabularies controlled by the language prediction representation 232. That is, the monolingual output layer 400 may include a token module 430 configured to receive, as input, the sequence of output node indexes 415 into a sequence of language-specific wordpiece models 420 and joins the sequence of language-specific wordpiece models 420 into word-level transcriptions, or vice versa. As a result, the monolingual output layer 400 may have the same structure, size, and performance of a monolingual ASR system while only using the single monolingual output layer 400 for multiple different languages.

Referring back to FIGS. 2A and 2B, in some implementations, the ASR model 200 operates in a streaming manner (FIG. 2A) such that the ASR model 200 outputs the initial speech recognition results 120a as soon as they are generated. In other implementations, the ASR model operates in a non-streaming manner (FIG. 2B) such that the ASR model 200 processes additional acoustic frames (e.g., additional right-context) to improve upon the initial speech recognition results 120a and generate the final speech recognition results 120b. The ASR model 200 may operate in the streaming manner and non-streaming manner in parallel. To that end, the audio encoder 204 includes a first encoder (i.e., causal encoder) 210 that operates in a streaming manner. That is, the first encoder 210 is configured to receive, as input, the sequence of acoustic frames 110 and generate, at each of the plurality of output steps, a first higher order feature representation 212 for a corresponding acoustic frame 110 in the sequence of acoustic frames 110. Stated differently, the first encoder 210 receives a sequence of d-dimensional feature vectors (e.g., sequence of acoustic frames 110) $x=(x_1, x_2, \ldots, x_T)$, where $x_t \in \mathbb{R}^d$, and generates, at each of a plurality of output steps, the first higher order feature representation 212 for the corresponding acoustic frame 110 in the sequence of acoustic frames 110. In some examples, the first encoder 210 includes 46 million parameters and has three (3) convolution layers followed by seven (7) Conformer blocks. In these examples, each Conformer block includes causal convolution and left-context attention layers to exclude the first encoder 210 from processing any right-context frames such that the first encoder 210 operates in the streaming fashion.

Referring now specifically to FIG. 2A, in some implementations, the LID predictor 230 is configured to receive, as input, the first higher order feature representation 212 generated by the first encoder 210 at each of the plurality of output steps and generate, at each of the plurality of output steps, the language prediction representation 232 based on a corresponding first higher order feature representation 212. A first decoder 240, 240a includes a first joint network 250, 250a, a first prediction network 300, 300a, and a first monolingual output layer 400, 400a. The first decoder 240a is configured to receive the first higher order feature representation 212 generated by the first encoder 210 at each of the plurality of output steps, the sequence of non-blank output symbols (e.g., output node index) 121 output by the first monolingual output layer 400a, and the language prediction representation 232 generated by the LID predictor 230 at each of the plurality of output steps and generate a first probability distribution 252, 252a over possible speech recognition results at each of the plurality of output steps. The first joint network 250a is configured to receive, as input, the first higher order feature representation 212 generated by the first encoder 210, the language prediction representation 232 generated by the LID predictor 230, and a first dense representation 350, 350a generated by the first prediction network 300a and generate, at each output step, the first probability distribution 252a over possible speech recognition results for a corresponding acoustic frame 110. Here, the first joint network 250a generates the first probability distribution 252a over possible speech recognition results using the first higher order feature representation 212, the first language prediction representation 232a, and the first dense representation 350a. Notably, the first decoder 240a operates in the streaming fashion such that the first probability distribution 252a over possible speech recognition results may correspond to partial speech recognition results.

The first prediction network 300a is configured to receive, as input, the sequence of non-blank symbols 121 output by the first monolingual output layer 400a and generate the first dense representation 350a based on the sequence of non-blank symbols 121 generated based on a previous acoustic frame 110. Optionally, the first prediction network 300a may receive the language prediction representation 232 (e.g., denoted by the dashed line) generated by the LID predictor 230 such that the first prediction network 300a generates the first dense representation 350a based on the sequence of non-blank symbols 121 and the language prediction representation 232. The first prediction network 300a outputs the first dense representation 350a to the first joint network 250a such that the first joint network 250a generates a subsequent probability distribution 252 using the first dense representation 350a based on prior acoustic frames 110. Moreover, the first monolingual output layer 400a generates the speech recognition result 120 based on the probability distribution 252 over possible speech recognition results output by the first joint network.

Referring now to FIG. 2B, in some implementations, the audio encoder 204 is a cascading encoder where the encoding pathway includes two encoders 210, 220 that cascade such that the output of the first encoder (i.e., causal encoder) 210 feeds the input of a second encoder (i.e., non-causal encoder) 220 prior to decoding. Here, the first encoder 210 and the second encoder 220 may be cascaded irrespective of the underlying architecture of each encoder 210, 220. The encoders 210, 220 may each include a stack of multi-head self-attention layers. The second encoder 220 may include 100 million parameters and use a 640-dimensional linear projection to transform the input features followed by ten 640-dimensional Conformer blocks and a final linear normalization layer.

With continued reference to FIG. 2B, the first encoder 210 receives the sequence of acoustic frames 110 and generates, at each output step, the first higher order feature representation 212. Similarly, the second encoder 220 is connected in cascade to the first encoder 210, and receives the first higher order feature representation 212 as input, and generates, at each output step, a second higher order feature representation 222 based on a corresponding one or more first higher order feature representations 212. In some instances, the second encoder 220 generates the second higher order feature representation 222 without receiving any of the acoustic frames 110 as input. In these instances, the second encoder 220 generates the second higher order feature representations 222 using only the first higher order feature representations 212 as input. Thus, the first higher order feature representations 212 output from the first encoder 210 are fed to the LID predictor 230 while the second higher order feature representations 222 output from the second encoder 220 are fed to a second decoder 240, 240b and the LID predictor 230.

In some configurations, the LID predictor 230 is configured to receive, as input, the first higher order feature representation 212 generated by the first encoder 210 at each of the plurality of output steps and the second higher order feature representation 222 generated by the second encoder 220 at each of the plurality of output steps. Here, the LID predictor 230 may generate a concatenation 231 of the first higher order feature representation 212 and the second higher order feature representation 222. Thereafter, the LID predictor 230 is further configured to generate, at each of the plurality of output steps, a language prediction representation 232 based on the concatenation 231 of the first higher order feature representation 212 and the second higher order feature representation 222. Advantageously, by generating the language prediction representation 232 based on the concatenation 231, the LID predictor 230 uses a diversity of inputs to generate the language prediction representation 232. In other configurations (not shown), the LID predictor 230 receives, as input, the first higher order feature representation 212 and generates the language prediction representation 232 based on the first higher order feature representation 212 whereby the LID predictor 230 outputs the language prediction representation 232 to the second decode 240b and the second encoder 220. Thus, in these configurations, the second encoder 220 generates the second higher order feature representation 222 based on the first higher order feature representation 212 and the language prediction representation 232.

The second decoder 240b includes a second joint network 250, 250b, a second prediction network 300, 300b, and a second monolingual output layer 400, 400b. In some examples, the first decoder 240a (FIG. 2A) and the second decoder 240b are separate decoders. In other examples, the first decoder 240a and the second decoder 240b are the same decoder. The second decoder 240b is configured to receive the second higher order feature representation 222 generated by the second encoder 220 at each of the plurality of output steps, the sequence of non-blank output symbols (e.g., output node index) 121 output by the second monolingual output layer 400b, and the language prediction representation 232 generated by the LID predictor 230 at each of the plurality of output steps and generate a second probability distribution 252, 252b over possible speech recognition results at each of the plurality of output steps. The second joint network 250b is configured to receive, as input, the second higher order feature representation 222 generated by the second encoder 220, the language prediction representation 232 generated by the LID predictor 230, and a second dense representation 350, 350b generated by the second prediction network 300b and generate, at each output step, the second probability distribution 252b over possible speech recognition results for a corresponding acoustic frame 110. Here, the second joint network 250b generates the second probability distribution 252b over possible speech recognition results using the second higher order feature representation 222, the language prediction representation 232, and the second dense representation 350b. Notably, the second decoder 240b operates in the non-streaming fashion such that the second probability distribution 252b improves upon the first probability distribution 252a by processing additional acoustic frames 110.

The second prediction network 300b is configured to receive, as input, the sequence of non-blank symbols 121 output by the second monolingual output layer 400b and generate the second dense representation 350b based on the sequence of non-blank symbols 121 generated based on a previous acoustic frame 110. Optionally, the second prediction network 300b may receive the language prediction representation 232 (e.g., denoted by the dashed line) generated by the LID predictor 230 such that the second prediction network 300b generates the second dense representation 350b based on the sequence of non-blank symbols 121 and the language prediction representation 232. The second prediction network 300b outputs the second dense representation 350b to the second joint network 250b such that the second joint network 250b generates a subsequent probability distribution 252 using the second dense representation 350b based on prior acoustic frames 110. Moreover, the second monolingual output layer 400b generates the speech recognition result 120 based on the probability distribution 252 over possible speech recognition results output by the second joint network 250b.

Figure 3:
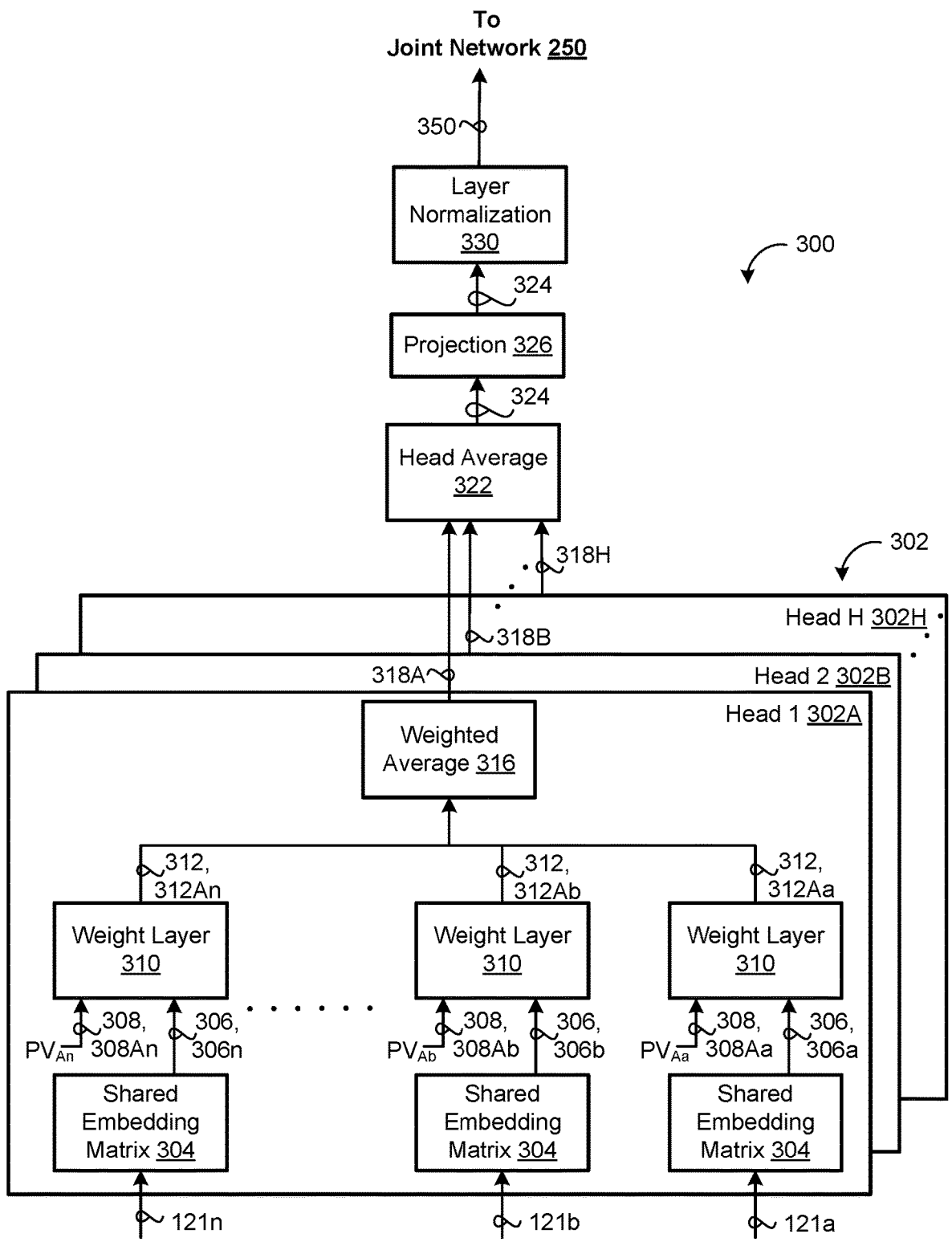
FIG. 3 is a schematic view of an example prediction network of the example speech recognition models of FIGS. 2A and 2B.

FIG. 3 shows the prediction network 300 of either the first or second decoder 240a, 240b (FIGS. 2A and 2B) receiving, as input, a sequence of non-blank symbols that is limited to the N previous non-blank symbols output 121. That is, the sequence of non-blank symbols 121, 121a-n may correspond to non-blank symbols of the speech recognition result 120. Thus, the sequence of non-blank symbols 121 and the speech recognition result 120 may be used interchangeably herein. In some examples, N is equal to two. In other examples, N is equal to five, however, the disclosure is non-limiting and N may equal any integer. In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{N \times d_e}$) for each non-blank symbol 121 among the sequence of non-blank symbols 121 received as input at the corresponding output step from the plurality of output steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols 121. The respective position vector PV 308 assigned to each non-blank symbol indicates a position in the history of the sequence of non-blank symbols (e.g., the N previous non-blank symbols). For instance, the first position vector $PV_{Aa}$ is assigned to a most recent position in the history, while the last position vector $PV_{An}$ is assigned to a last position in the history of the N previous non-blank symbols. Notably, each of the embeddings 306 may include a same dimensionality (i.e., dimension size) as each of the position vectors PV 308.

While the corresponding embedding generated by the shared embedding matrix 304 for each for each non-blank symbol 121 among the sequence of non-blank symbols 121, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ $308_{Ba-Bn}$, and the $H^{th}$ head 302 H defines another different row of position vectors $PV_{Ha-Hn}$ $308_{Ha-Hn}$.

For each non-blank symbol in the sequence of non-blank symbols 121 received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H * N} \sum_{h,n} X_n * \sum_e (X_{n,e} * P_{h,n,e}) \quad (2)$$

In Equation 2, h represents the index of the heads 302, n represents position in context, and e represents the embedding dimension. Additionally, in Equation 3, H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector 350 at the corresponding time step from the plurality of time steps. The prediction network 300 generates only a single embedding vector 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector 350.

Figure 5:
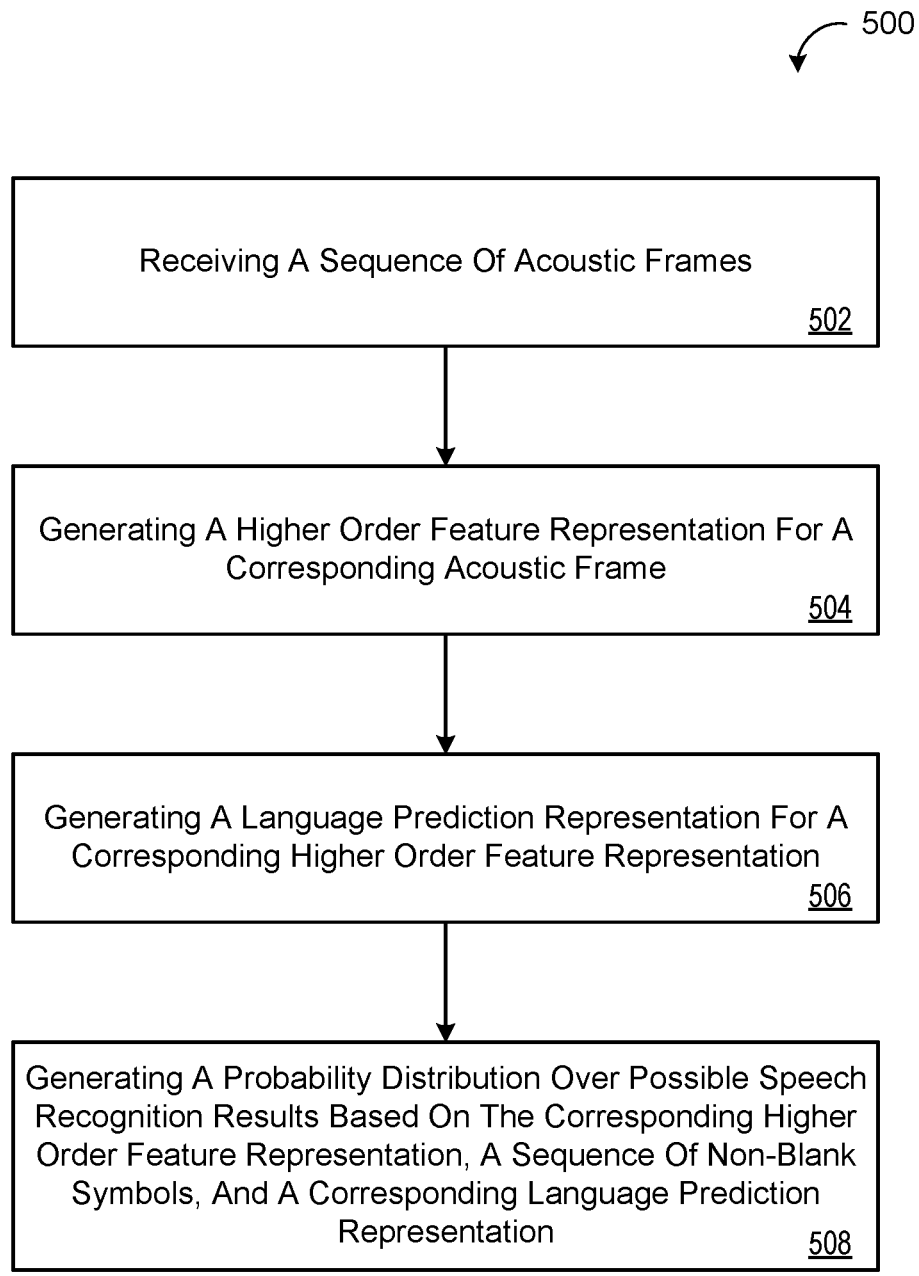
FIG. 5 is flowchart of example arrangement of operations for a computer-implemented method of using a universal monolingual output layer for multilingual speech recognition.
Figure 6:
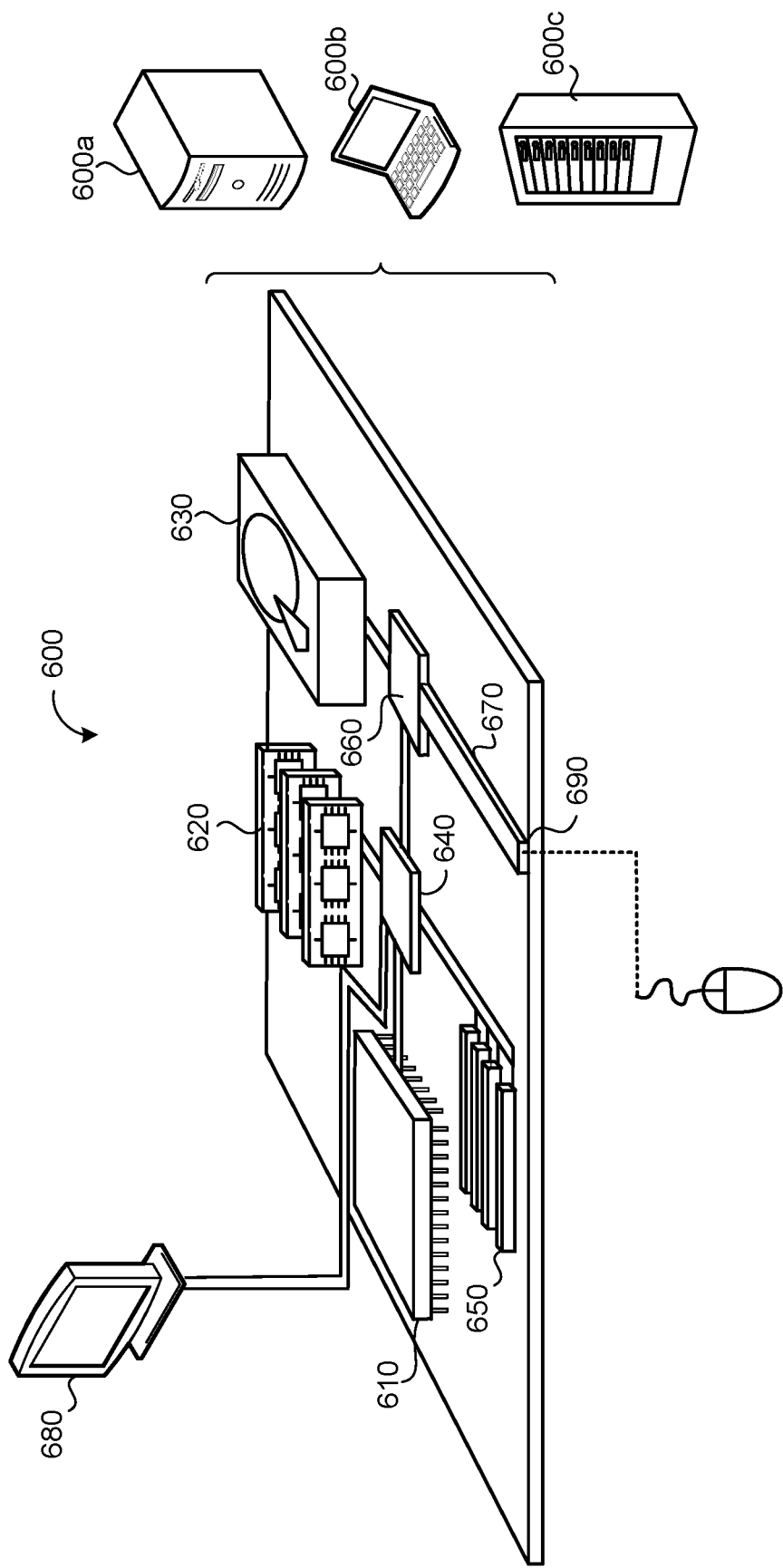
FIG. 6 is a schematic view of an example computing device that may be used to implement the systems and methods described herein.

FIG. 5 is a flowchart of an example arrangement of operations for a computer-implemented method 500 of using a universal monolingual output layer for multilingual speech recognition. The method 500 may execute on data processing hardware 610 (FIG. 6) using instructions stored on memory hardware 620 (FIG. 6). The data processing hardware 610 and the memory hardware may reside on the user device 10 and/or the remote computing device 60 of FIG. 1 each corresponding to the computing device 600 (FIG. 6).

At operation 502, the method 500 includes receiving as input to a multilingual ASR model 200 that is configured to recognize speech in a plurality of different supported languages, a sequence of acoustic frames 110. For instance, the sequence of acoustic frames 110 may characterize an utterance 106 spoken by a user 104. The utterance 106 may be a code-switched utterance that includes at least two different languages (i.e., spoken by a bilingual user 104). At operation 504, the method 500 includes generating, by an audio encoder 204 of the multilingual ASR model 200, at each of a plurality of output steps, a higher order feature representation 212, 222 for a corresponding acoustic frame 110 in the sequence of acoustic frames 110. Here, the higher order feature representation 212, 222 may be a first higher order feature representation 212 (FIG. 2A) generated by a first encoder 210 of the audio encoder 204 in a streaming fashion or a second higher order feature representation 222 (FIG. 2B) generated by a second encoder 220 of the audio encoder 204 in a non-streaming fashion. At operation 506, the method 500 includes generating, by a LID predictor 230 of the multilingual ASR model 200, at each of the plurality of output steps, a language prediction representation 232 for a corresponding higher order feature representation 212, 222 generated by the audio encoder 204.

At operation 508, the method 500 includes generating by a decoder 240 of the multilingual ASR model 200, at each of the plurality of output steps, a probability distribution 252 over possible speech recognition results. The decoder 240 includes a monolingual output layer 400 that has a plurality of output nodes 410 each sharing a plurality of language-specific wordpiece models 420. Moreover, the decoder 240 generates the probability distribution 252 over possible speech recognition results based on corresponding higher order feature representation 212, 222 generated by the audio encoder 204, a sequence of non-blank symbols 121 output by the monolingual output layer 400, and corresponding language prediction representation 232 generated by the LID predictor 230.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A system comprising:
    data processing hardware; and
    memory hardware in communication with the data processing hardware, the memory hardware storing instructions that when executed on the data processing hardware cause the data processing hardware to perform operations corresponding to a multilingual automated speech recognition (ASR) model for recognizing speech in a plurality of different supported languages, the multilingual ASR model comprising:
    an audio encoder configured to:
        receive, as input, a sequence of acoustic frames; and
        generate, at each of a plurality of output steps, a higher order feature representation for a corresponding acoustic frame in the sequence of acoustic frames; and
    a language identification (LID) predictor configured to:
        receive, as input, the higher order feature representation generated by the audio encoder at each of the plurality of output steps; and
        generate, at each of the plurality of output steps, a language prediction representation; and
    a decoder comprising a monolingual output layer having a plurality of output nodes each sharing a plurality of language-specific wordpiece models, wherein the decoder is configured to:
        receive, as input, the higher order feature representation generated by the audio encoder at each of the plurality of output steps, a sequence of non-blank symbols output by the monolingual output layer, and the language prediction representation generated by the LID predictor at each of the plurality of output steps; and generate, at each of the plurality of output steps, a probability distribution over possible speech recognition results.

2. The system of claim 1, wherein:
each language of the plurality of different supported languages comprises V number of wordpiece models;
the monolingual output layer comprises an input size equal to H; and
the monolingual output layer comprises a dimension equal to H×V.

3. The system of claim 1, wherein each language-specific wordpiece model of the plurality of language-specific wordpiece models shared by each corresponding output node comprises a language-specific wordpiece model corresponding to a respective language among the plurality of different supported languages that is different than the respective languages corresponding to the other language-specific wordpiece models shared by the corresponding output node.

4. The system of claim 3, wherein each language-specific wordpiece model comprises a respective wordpiece token vocabulary in a writing system corresponding to the respective language.

5. The system of claim 1, wherein the sequence of acoustic frames received as input at the audio encoder characterize an utterance spoken in at least one of the plurality of different supported languages.

6. The system of claim 5, wherein the utterance comprises a code-mixed utterance comprising one or more words spoken in a first language and one or more other words spoken in a second language.

7. The system of claim 1, wherein, for each of the plurality of different supported languages, the plurality of output nodes of the monolingual output layer associate to corresponding language-specific wordpiece models for each of the plurality of different supported languages alphabetically.

8. The system of claim 1, wherein, when two or more of the plurality of different supported languages share a same corresponding language-specific wordpiece model, the monolingual output layer associates the same corresponding language-specific wordpiece model to share a same one of the plurality of output nodes.

9. The system of claim 8, wherein an associating process associates same language-specific wordpiece models shared by different languages to output nodes by:
identifying all language-specific wordpiece models across all of the plurality of different supported languages that are shared by two or more of the plurality of different languages; and
for each corresponding language-specific wordpiece model identified as being shared by two or more of the plurality of different languages:
indexing the corresponding language-specific wordpiece model from 1 to S, wherein S denotes a number of the different languages that share the corresponding language-specific wordpiece model; and
assigning the corresponding language-specific wordpiece model to occupy a respective one of the plurality of output nodes for each of the S number of the different languages that share the corresponding language-specific wordpiece model.

10. The system of claim 9, wherein, for the corresponding language-specific wordpiece model assigned to occupy the respective one of the plurality of output nodes for each of the S number of different languages, the associating process merges the corresponding language-specific wordpiece model indexed from 1 to S into a single language-specific wordpiece model shared by each of the S number of the different languages.

11. The system of claim 1, wherein:
the language prediction representation received as input at the decoder at each of the plurality of output steps represents a probability distribution over possible languages among the plurality of different supported languages that is predicted for a corresponding acoustic frame in the sequence of acoustic frames; and
the decoder generates the probability distribution over possible speech recognition results at each of the plurality of output steps only over the language-specific wordpiece models that correspond to the top-K languages in the probability distribution over possible languages represented by the language prediction representation at the corresponding output step.

12. The system of claim 11, wherein:
K is less than a total number of the different supported languages; and
K comprises a frame-dependent variable that adapts.

13. The system of claim 1, wherein the monolingual output layer performs beam-searching over a top N candidate hypotheses selected from the probability distribution over possible speech recognition results at each of the plurality of output steps.

14. The system of claim 1, wherein the decoder further comprises:
a prediction network configured to:
receive, as input, the sequence of non-blank symbols output by the monolingual output layer and the language prediction representation generated by the LID predictor at each of the plurality of output steps; and
generate, at each of the plurality of output steps, a dense representation; and
a joint network configured to:
receive, as input, the dense representation generated by the prediction network at each of the plurality of output steps, the higher order feature representation generated by the audio encoder at each of the plurality of output steps, and the language prediction representation generated by the LID predictor at each of the plurality of output steps; and
generate, at each of the plurality of output steps, the probability distribution over possible speech recognition results.

15. The system of claim 14, wherein the joint network comprises a combination structure that stacks gating and bilinear pooling to fuse the dense representation generated by the prediction network and the higher order feature representation generated by the audio encoder.

16. The system of claim 1, wherein:
the audio encoder comprises a cascaded encoder comprising:
a first encoder configured to:
receive, as input, the sequence of acoustic frames; and
generate, at each of the plurality of output steps, a first higher order feature representation for a corresponding acoustic frame in the sequence of acoustic frames; and a second encoder configured to:
receive, as input, the first higher order feature representation generated by the first encoder at each of the plurality of output steps; and
generate, at each of the plurality of output steps, a second higher order feature representation for a corresponding first higher feature representation; and
the LID predictor is further configured to:
receive, as input, a concatenation of the first higher order feature representation generated by the first encoder at each of the plurality of output steps and the second higher order feature representation generated by the second encoder at each of the plurality of output steps; and
generate, at each of the plurality of output steps, the language prediction representation.

17. The system of claim 1, wherein:
the audio encoder comprises a cascaded encoder comprising a first encoder and a second encoder;
the first encoder is configured to:
receive, as input, the sequence of acoustic frames; and
generate, at each of the plurality of output steps, a first higher order feature representation for a corresponding acoustic frame in the sequence of acoustic frames;
the LID predictor is configured to:
receive, as input, the first higher order feature representation generated by the first encoder at each of the plurality of output steps; and
generate, at each of the plurality of output steps, the language prediction representation; and
the second encoder is configured to:
receive, as input, a concatenation of the first higher order feature representation generated by the first encoder at each of the plurality of output steps and the language prediction representation generated by the language ID predictor at each of the plurality of output steps; and
generate, at each of the plurality of output steps, a second higher order feature representation for a corresponding first higher order feature representation.

18. A computer-implemented method that when executed on data processing hardware causes the data processing hardware to perform operations comprising:
receiving, as input to a multilingual automated speech recognition (ASR) model configured to recognize speech in a plurality of different supported languages, a sequence of acoustic frames;
generating, by an audio encoder of the multilingual ASR model, at each of a plurality of output steps, a higher order feature representation for a corresponding acoustic frame in the sequence of acoustic frames;
generating, by a language identification (LID) predictor of the multilingual ASR model, at each of the plurality of output steps, a language prediction representation for a corresponding higher order feature representation generated by the audio encoder; and
generating, by a decoder of the multilingual ASR model, at each of the plurality of output steps, a probability distribution over possible speech recognition results, the decoder comprising a monolingual output layer having a plurality of output nodes each sharing a plurality of language-specific wordpiece models, the probability distribution over possible speech recognition results based on the corresponding higher order feature representation generated by the audio encoder, a sequence of non-blank symbols output by the monolingual output layer, and a corresponding language prediction representation generated by the LID predictor.

19. The computer-implemented method of claim 18, wherein:
each language of the plurality of different supported languages comprises V number of wordpiece models;
the monolingual output layer comprises an input size equal to H; and
the monolingual output layer comprises an input size equal to H.

20. The computer-implemented method of claim 18, wherein each language-specific wordpiece model of the plurality of language-specific wordpiece models shared by each corresponding output node comprises a language-specific wordpiece model corresponding to a respective language among the plurality of different supported languages that is different than the respective languages corresponding to the other language-specific wordpiece models shared by the corresponding output node.

21. The computer-implemented method of claim 20, wherein each language-specific wordpiece model comprises a respective wordpiece token vocabulary in a writing system corresponding to the respective language.

22. The computer-implemented method of claim 18, wherein the sequence of acoustic frames received as input at the audio encoder characterize an utterance spoken in at least one of the plurality of different supported languages.

23. The computer-implemented method of claim 22, wherein the utterance comprises a code-mixed utterance comprising one or more words spoken in a first language and one or more other words spoken in a second language.

24. The computer-implemented method of claim 18, wherein, for each of the plurality of different supported languages, the plurality of output nodes of the monolingual output layer associate to corresponding language-specific wordpiece models for each of the plurality of different supported languages alphabetically.

25. The computer-implemented method of claim 18, wherein the operations further comprise, when two or more of the plurality of different supported languages share a same corresponding language-specific wordpiece model, associating, by the monolingual output layer, the same corresponding language-specific wordpiece model to share a same one of the plurality of output nodes.

26. The computer-implemented method of claim 25, wherein the monolingual output layer associates same language-specific wordpiece models shared by different languages to output nodes by:
identifying all language-specific wordpiece models across all of the plurality of different supported languages that are shared by two or more of the plurality of different languages; and
for each corresponding language-specific wordpiece model identified as being shared by two or more of the plurality of different languages:
indexing the corresponding language-specific wordpiece model from 1 to S, wherein S denotes a number of the different languages that share the corresponding language-specific wordpiece model; and
assigning the corresponding language-specific wordpiece model to occupy a respective one of the plurality of output nodes for each of the S number of the different languages that share the corresponding language-specific wordpiece model.

27. The computer-implemented method of claim 26, wherein, for the corresponding language-specific wordpiece model assigned to occupy the respective one of the plurality of output nodes for each of the S number of different languages, the monolingual output layer merges the corresponding language-specific wordpiece model indexed from 1 to S into a single language-specific wordpiece model shared by each of the S number of the different languages.

28. The computer-implemented method of claim 18, wherein:
the language prediction representation generated by the LID predictor at each of the plurality of output steps represents a probability distribution over possible languages among the plurality of different supported languages that is predicted for a corresponding acoustic frame in the sequence of acoustic frames; and
generating the probability distribution over possible speech recognition results comprises generating the probability distribution over possible speech recognition results only over the language-specific wordpiece models that correspond to the top-K languages in the probability distribution over possible languages represented by the corresponding language prediction representation.

29. The computer-implemented method of claim 28, wherein:
K is less than a total number of the different supported languages; and
K comprises a frame-dependent variable that adapts.

30. The computer-implemented method of claim 18, wherein the operations further comprise performing, by the monolingual output layer, beam-searching over a top N candidate hypotheses selected from the probability distribution over possible speech recognition results at each of the plurality of output steps.

31. The computer-implemented method of claim 18, wherein the operations further comprise:
generating, by a prediction network of the decoder, at each of the plurality of output steps, a dense representation based on the sequence of non-blank symbols output by the monolingual output layer and the corresponding language prediction representation generated by the LID predictor; and
generating, by a joint network of the decoder, at each of the plurality of output steps, the probability distribution over possible speech recognition results based on a corresponding dense representation generated by the prediction network, the corresponding higher order feature representation generated by the audio encoder, and the corresponding language prediction representation generated by the LID predictor.

32. The computer-implemented method of claim 31, wherein the joint network comprises a combination structure that stacks gating and bilinear pooling to fuse the dense representation generated by the prediction network and the higher feature representation generated by the audio encoder.

33. The computer-implemented method of claim 18, wherein the audio encoder comprises a cascaded encoder and the operations further comprise:
generating, by a first encoder of the cascaded encoder, at each of the plurality of output steps, a first higher order feature representation for the corresponding acoustic frame in the sequence of acoustic frames; and
generating, by a second encoder of the cascaded encoder, at each of the plurality of output steps, a second higher order feature representation for a corresponding first higher feature representation,
wherein generating the language prediction representation for the corresponding higher order feature representation is based on a concatenation of the corresponding first higher order feature representation generated by the first encoder and a corresponding second higher order feature representation generated by the second encoder.

34. The computer-implemented method of claim 18, wherein the audio encoder comprises a cascaded encoder and the operations further comprise:
generating, by a first encoder of the cascaded encoder, at each of the plurality of output steps, a first higher order feature representation for the corresponding acoustic frame in the sequence of acoustic frames; and
generating, by a second encoder of the cascaded encoder, at each of the plurality of output steps, a second higher order feature representation based on a concatenation of a corresponding first higher order feature representation generated by the first encoder and the corresponding language prediction representation generated by the language ID predictor,
wherein generating the language prediction representation for the corresponding higher order feature representation is based on a corresponding first higher order feature representation generated by the first encoder.

* * * * *